(12) United States Patent
Nakamura et al.

(10) Patent No.: US 10,378,471 B2
(45) Date of Patent: Aug. 13, 2019

(54) CONTROL APPARATUS AND CONTROL METHOD FOR INTERNAL COMBUSTION ENGINE

(71) Applicant: TOYOTA JIDOSHA KABUSHIKI KAISHA, Toyota-shi, Aichi-ken (JP)

(72) Inventors: Takashi Nakamura, Toyota (JP); Yuki Nose, Kasugai (JP); Eiji Ikuta, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/848,500

(22) Filed: Dec. 20, 2017

(65) Prior Publication Data

US 2018/0179977 A1 Jun. 28, 2018

(30) Foreign Application Priority Data

Dec. 26, 2016 (JP) ................................. 2016-252115

(51) Int. Cl.
*F02D 41/22* (2006.01)
*F02D 41/00* (2006.01)
(Continued)

(52) U.S. Cl.
CPC ......... *F02D 41/221* (2013.01); *F02D 41/008* (2013.01); *F02D 41/024* (2013.01);
(Continued)

(58) Field of Classification Search
CPC .. F02D 41/008; F02D 41/0085; F02D 41/024; F02D 41/0255; F02D 41/221; F02D 41/1495; F02D 2200/1015
(Continued)

(56) References Cited

U.S. PATENT DOCUMENTS

2004/0250534 A1* 12/2004 Tanaka ................ F02D 41/0255
60/284
2005/0066650 A1* 3/2005 Demura .................... F01N 3/32
60/276
(Continued)

FOREIGN PATENT DOCUMENTS

JP  05018311 A  *  1/1993
JP  2005-315198 A    11/2005
(Continued)

*Primary Examiner* — John M Zaleskas
(74) *Attorney, Agent, or Firm* — Oliff PLC

(57) ABSTRACT

A control for an internal combustion engine makes an air-fuel ratio in at least one of a plurality of cylinders equal to a rich air-fuel ratio smaller than a theoretical air-fuel ratio, makes an air-fuel ratio in each of the other remaining ones of the plurality of the cylinders equal to a lean air-fuel ratio larger than the theoretical air-fuel ratio, executes a temperature raising process for raising a temperature of a catalyst that purifies exhaust gas from the plurality of the cylinders, executes a detection process for detecting a degree of dispersion of the air-fuel ratio among the plurality of the cylinders, and executes a determination process for determining, based on the detected degree of dispersion, whether or not a plurality of fuel injection valves corresponding to the plurality of the cylinders respectively are normal, and executes the detection process while avoiding a period of the temperature raising process.

3 Claims, 6 Drawing Sheets

(51) Int. Cl.
*F02D 41/02* (2006.01)
*F02D 41/14* (2006.01)

(52) U.S. Cl.
CPC .. *F02D 41/1454* (2013.01); *F02D 2200/0614* (2013.01); *Y02T 10/26* (2013.01)

(58) Field of Classification Search
USPC ............... 73/114.02, 114.03, 114.04, 114.05, 73/114.07, 114.11
See application file for complete search history.

(56) References Cited

U.S. PATENT DOCUMENTS

| | | | | |
|---|---|---|---|---|
| 2005/0071073 | A1* | 3/2005 | Ueda | F02D 37/02 701/101 |
| 2005/0241301 | A1 | 11/2005 | Okugawa et al. | |
| 2005/0241376 | A1* | 11/2005 | Miyata | F02D 37/02 73/114.04 |
| 2007/0163547 | A1* | 7/2007 | Nakasaka | F02D 13/0207 123/478 |
| 2008/0196485 | A1* | 8/2008 | Akimoto | G01M 15/046 73/114.02 |
| 2009/0260347 | A1* | 10/2009 | Iwazaki | F01N 3/10 60/277 |
| 2009/0260419 | A1 | 10/2009 | Maeda et al. | |
| 2009/0292446 | A1* | 11/2009 | Tanaka | F02B 37/18 701/103 |
| 2011/0054761 | A1* | 3/2011 | Sawada | F02D 41/0085 701/103 |
| 2011/0179774 | A1* | 7/2011 | Iihoshi | F02D 41/0085 60/276 |
| 2011/0191005 | A1* | 8/2011 | Iwazaki | F01N 11/00 701/101 |
| 2011/0231084 | A1* | 9/2011 | Nagakura | F02D 41/1498 701/111 |
| 2011/0288739 | A1* | 11/2011 | Kidokoro | F02D 41/0085 701/99 |
| 2012/0072095 | A1* | 3/2012 | Shinoda | F02D 19/0647 701/103 |
| 2012/0109497 | A1* | 5/2012 | Anzawa | F02D 41/1456 701/103 |
| 2012/0253642 | A1* | 10/2012 | Kitano | F02D 41/0085 701/104 |
| 2012/0290191 | A1* | 11/2012 | Kobayashi | F02D 41/0085 701/102 |
| 2012/0297866 | A1 | 11/2012 | Tanaka et al. | |
| 2013/0226380 | A1* | 8/2013 | Ando | B60W 20/108 701/22 |
| 2013/0261936 | A1* | 10/2013 | Suzuki | F02D 41/3005 701/104 |
| 2014/0288802 | A1 | 9/2014 | Katayama et al. | |
| 2015/0114376 | A1* | 4/2015 | Suzuki | F02D 41/008 123/704 |
| 2015/0192083 | A1* | 7/2015 | Suzuki | F02D 41/1454 701/101 |
| 2015/0292422 | A1* | 10/2015 | Tsunooka | F02B 37/183 60/602 |
| 2015/0300245 | A1* | 10/2015 | Korenaga | F02B 37/18 60/603 |
| 2015/0308364 | A1* | 10/2015 | Hojo | F02D 41/1439 60/285 |
| 2018/0179973 | A1* | 6/2018 | Tsuruoka | F02D 41/0245 |
| 2018/0209367 | A1* | 7/2018 | Hashinokuchi | F02D 41/008 |
| 2018/0313287 | A1* | 11/2018 | Shogenji | F02D 41/2448 |
| 2019/0048818 | A1* | 2/2019 | Suzuki | F02D 41/1454 |

FOREIGN PATENT DOCUMENTS

| | | |
|---|---|---|
| JP | 2009-174443 A | 8/2009 |
| JP | 2009-257245 A | 11/2009 |
| JP | 2011-226317 A | 11/2011 |
| JP | 2012-057492 A | 3/2012 |
| JP | 2012-241666 A | 12/2012 |
| JP | 2013-133790 A | 7/2013 |
| JP | 2014-185554 A | 2/2014 |

* cited by examiner

CONTROL APPARATUS AND CONTROL METHOD FOR INTERNAL COMBUSTION ENGINE

CROSS-REFERENCE TO RELATED APPLICATIONS

This application claims priority to Japanese Patent Application No. 2016-252115 filed on Dec. 26, 2016, which is incorporated herein by reference in its entirety.

BACKGROUND

1. Technical Field

The disclosure relates to a control apparatus and a control method for an internal combustion engine.

2. Description of Related Art

There is known a temperature raising process for raising the temperature of a catalyst to an appropriate temperature with a view to suppressing the deterioration in the emission properties of exhaust gas from an internal combustion engine. As the temperature raising process, the control for setting the target air-fuel ratio of one of a plurality of cylinders of the internal combustion engine to a rich air-fuel ratio and setting the target air-fuel ratio of each of the other cylinders to a lean air-fuel ratio is known (e.g., see Japanese Patent Application Publication No. 2012-057492 (JP 2012-057492 A)).

Besides, the degree of dispersion of the air-fuel ratio among the plurality of the cylinders may become large to cause a deterioration in the emission properties of exhaust gas, due to the occurrence of an abnormality such as clogging or the like in one or some of the fuel injection valves. Therefore, there is known an art of executing a detection process for detecting the degree of dispersion of the air-fuel ratio, and determining that there is an abnormality in one or some of the fuel injection valves when the degree of dispersion is large (e.g., see Japanese Patent Application Publication No. 2014-185554 (JP 2014-185554 A)).

SUMMARY

The above-mentioned temperature raising process is the control for intentionally causing the dispersion of the air-fuel ratio among the plurality of the cylinders. Therefore, when the detection process is executed during the execution of the temperature raising process, a large degree of dispersion of the air-fuel ratio may be detected, and it may be determined that there is an abnormality in one or some of the fuel injection valves, despite the fact that all the fuel injection valves are normal.

Thus, in view of the aforementioned circumstances, the disclosure provides a control apparatus and a control method for an internal combustion engine that suppresses the deterioration in the accuracy in determining whether or not there is an abnormality in fuel injection valves.

According to one aspect of the disclosure, there is provided a control apparatus for an internal combustion engine configured as follows. The control apparatus is equipped with an electronic control unit. Moreover, this electronic control unit is configured to: (i) make an air-fuel ratio in at least one of a plurality of cylinders belonging to the internal combustion engine equal to a rich air-fuel ratio that is smaller than a theoretical air-fuel ratio, (ii) make an air-fuel ratio in each of the other remaining ones of the plurality of the cylinders equal to a lean air-fuel ratio that is larger than the theoretical air-fuel ratio, (iii) execute a temperature raising process for raising a temperature of a catalyst that purifies exhaust gas from the plurality of the cylinders, (iv) execute a detection process for detecting a degree of dispersion of the air-fuel ratio among the plurality of the cylinders, (v) execute a determination process for determining whether or not a plurality of fuel injection valves corresponding to the plurality of the cylinders respectively are normal, based on the detected degree of dispersion, and (vi) execute the detection process while avoiding a period in which the temperature raising process is being executed.

According to another aspect of the disclosure, there is provided a control method for an internal combustion engine. The internal combustion engine includes a plurality of cylinders. The control method controls the internal combustion engine as follows, (i) to make an air-fuel ratio in at least one of a plurality of cylinders belonging to the internal combustion engine equal to a rich air-fuel ratio that is smaller than a theoretical air-fuel ratio, (ii) to make an air-fuel ratio in each of the other remaining ones of the plurality of the cylinders equal to a lean air-fuel ratio that is larger than the theoretical air-fuel ratio (iii) execute a temperature raising process for raising a temperature of a catalyst that purifies exhaust gas from the plurality of the cylinders, (iv) execute a detection process for detecting a degree of dispersion of the air-fuel ratio among the plurality of the cylinders, (v) execute a determination process for determining whether or not a plurality of fuel injection valves corresponding to the plurality of the cylinders respectively are normal, based on the detected degree of dispersion, and (vi) execute the detection process while avoiding a period in which the temperature raising process is being executed.

According to the control apparatus and the control method for the internal combustion engine as described above, the execution of the detection process during the execution of the temperature raising process is avoided, and the deterioration in the accuracy in determining whether or not there is an abnormality in the fuel injection valves is suppressed.

Besides, in the control apparatus, the electronic control unit may be configured to permit execution of the temperature raising process when it is determined that the plurality of the fuel injection valves are normal after completion of the detection process.

Besides, in the control apparatus, the electronic control unit may be configured to stop the temperature raising process and execute the detection process when there is a request to execute the detection process during execution of the temperature raising process.

The control apparatus and the control method for the internal combustion engine according to the disclosure as described above can suppress the deterioration in the accuracy in determining whether or not there is an abnormality in the fuel injection valves.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein.

DETAILED DESCRIPTION OF EMBODIMENT

Figure 1:
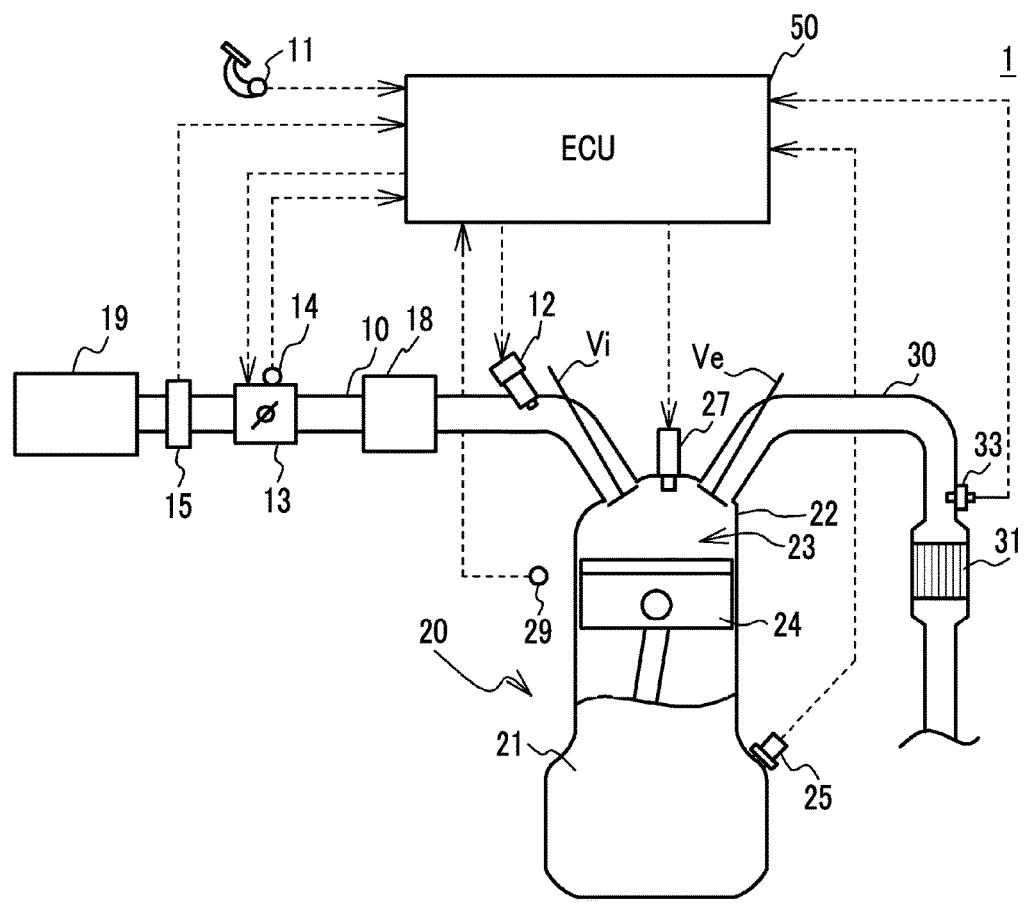
FIG. 1 is a schematic configuration view of an engine system to which a control apparatus for an internal combustion engine according to the embodiment of the disclosure as an example thereof is applied.

FIG. 1 is a schematic configuration view of an engine system 1. As shown in FIG. 1, the engine system 1 is equipped with a three-way catalyst 31 that purifies exhaust gas of an engine 20. In the engine 20, an air-fuel mixture is burned in a combustion chamber 23 in a cylinder head 22 that is arranged on a cylinder block 21, and a piston 24 is thereby moved in a reciprocating manner. The engine 20 is an in-line four-cylinder engine, but is not limited thereto as long as it has a plurality of cylinders.

An intake valve Vi that opens/closes an intake port, and an exhaust valve Ve that opens/closes an exhaust port are provided for each of the cylinders in the cylinder head 22 of the engine 20. Besides, an ignition plug 27 for igniting the air-fuel mixture in the combustion chamber 23 is attached to a top portion of the cylinder head 22 for each of the cylinders.

The intake port of each of the cylinders is connected to a surge tank 18 via a branch pipe for each of the cylinders. An intake pipe 10 is connected upstream of the surge tank 18, and an air cleaner 19 is provided at an upstream end of the intake pipe 10. Moreover, the intake pipe 10 is provided, sequentially from an upstream side thereof, with an airflow meter 15 for detecting an amount of intake air, and an electronically controlled throttle valve 13.

Besides, a fuel injection valve 12 that injects fuel into the intake port is installed in the intake port of each of the cylinders. The fuel injected from the fuel injection valve 12 is mixed with intake air to constitute the air-fuel mixture. This air-fuel mixture is sucked into the combustion chamber 23, compressed by the piston 24, and burned through ignition by the ignition plug 27 when the intake valve Vi is open. Incidentally, instead of the fuel injection valve 12 that injects fuel into the intake port, a fuel injection valve that directly injects fuel into each of the cylinders may be provided, or fuel injection valves that inject fuel into the intake port and each of the cylinders respectively may be both provided.

On the other hand, the exhaust port of each of the cylinders is connected to an exhaust pipe 30 via the branch pipe for each of the cylinders. The exhaust pipe 30 is provided with the three-way catalyst 31. The three-way catalyst 31 has an oxygen occlusion capacity, and purifies NOx, HC, and CO. The three-way catalyst 31 is obtained by forming one or a plurality of catalytic layers on, for example, a substrate such as cordierite or the like, especially on a honeycomb substrate. Each of the catalytic layers includes a catalyst carrier such as alumina ($Al_2O_3$) or the like, and a catalyst metal such as platinum (Pt), palladium (Pd), rhodium (Rh) or the like carried on the catalyst carrier. The three-way catalyst 31 is an exemplary catalyst that purifies the exhaust gas discharged from the plurality of the cylinders belonging to the engine 20. The three-way catalyst 31 may be an oxidation catalyst, or a gasoline particulate filter that is coated with an oxidation catalyst.

An air-fuel ratio sensor 33 for detecting an air-fuel ratio of exhaust gas is installed upstream of the three-way catalyst 31. The air-fuel ratio sensor 33 is a so-called wide-range air-fuel ratio sensor. The air-fuel ratio sensor 33 can continuously detect an air-fuel ratio ranging over a relatively wide range, and outputs a signal having a value proportional to the air-fuel ratio.

The engine system 1 is equipped with a control apparatus for controlling the engine 20. Moreover, this control apparatus is equipped with an electronic control unit (an ECU) 50. The ECU 50 as an example of the control apparatus is equipped with a central processing unit (a CPU), a random access memory (a RAM), a read only memory (a ROM), a storage device, and the like. The ECU 50 controls the engine 20 by executing a program stored in the ROM and the storage device. Besides, the ECU 50 executes a temperature raising process, a detection process, and a determination process that will be described later. These kinds of control are realized by a temperature raising process unit, a detection process unit, and a determination process unit of the ECU 50 respectively, which are functionally realized by the CPU, the ROM, and the RAM. The details will be described later.

The above-mentioned ignition plug 27, the above-mentioned throttle valve 13, the above-mentioned fuel injection valve 12, and the like are electrically connected to the ECU 50. Besides, an accelerator depression amount sensor 11 that detects an accelerator depression amount, a throttle opening degree sensor 14 that detects a throttle opening degree of the throttle valve 13, the airflow meter 15 that detects an amount of intake air, the air-fuel ratio sensor 33, a crank angle sensor 25 that detects a crank angle of the engine 20, a coolant temperature sensor 29 that detects a temperature of coolant of the engine 20, and various other sensors are electrically connected to the ECU 50 via A/D converters (not shown) and the like. The ECU 50 controls the ignition plug 27, the throttle valve 13, the fuel injection valve 12 and the like to control the ignition timing, the fuel injection amount, the fuel injection timing, the throttle opening degree and the like respectively, such that a desired output is obtained, based on detection values of the various sensors and the like.

Next, the setting of a target air-fuel ratio by the ECU 50 will be described. In a normal state where the temperature raising process that will be described later is not executed, the target air-fuel ratio is set in accordance with the state of the engine 20. For example, the target air-fuel ratio is set to a theoretical air-fuel ratio in a low-rotation low-load range, and the target air-fuel ratio is set to a rich side from the theoretical air-fuel ratio in a high-rotation high-load range. When the target air-fuel ratio is set, the amount of fuel injection to each of the cylinders is controlled through feedback such that the air-fuel ratio detected by the air-fuel ratio sensor 33 coincides with the target air-fuel ratio.

Besides, the ECU 50 executes the temperature raising process for desorbing sulfur compounds (SOx) deposited in the three-way catalyst 31 and regenerating the purification capacity of the three-way catalyst 31, by raising the temperature of the three-way catalyst 31 to a predetermined temperature range. In the temperature raising process, so-called dither control for setting the target air-fuel ratio in one of the plurality of the cylinders to a rich air-fuel ratio that is smaller than the theoretical air-fuel ratio and setting the target air-fuel ratio in each of the other three remaining cylinders to a lean air-fuel ratio that is larger than the theoretical air-fuel ratio is performed. Besides, the average of the target air-fuel ratios of all the cylinders is set to the theoretical air-fuel ratio, but is not absolutely required to be equal to the theoretical air-fuel ratio. The average of the target air-fuel ratios of all the cylinders may be equal to an air-fuel ratio that allows the temperature of the three-way catalyst 31 to be raised to a desired temperature within a predetermined range including the theoretical air-fuel ratio. For example, the rich air-fuel ratio is set between 9 and 12, and the lean air-fuel ratio is set between 15 and 16. Besides, the target air-fuel ratio of at least one of the plurality of the cylinders may be set to the rich air-fuel ratio, and the target air-fuel ratio of each of the other remaining cylinders may be set to the lean air-fuel ratio.

When the temperature raising process is executed as described above, the surplus fuel discharged from the cylinder whose target air-fuel ratio is set to the rich air-fuel ratio adheres to the three-way catalyst 31, and burns under a lean atmosphere resulting from the exhaust gas discharged from each of the cylinders whose target air-fuel ratio is set to the lean air-fuel ratio. Thus, the temperature of the three-way catalyst 31 is raised, and SOx is desorbed.

Besides, the ECU 50 executes the detection process for detecting the dispersion (referred to also as the imbalance) of the air-fuel ratio among the plurality of the cylinders. It should be noted herein that when the air-fuel ratio disperses among the plurality of the cylinders, the fluctuation rate of the detection value of the crank angle sensor 25, namely, the gradient of the detection value thereof increases, so the dispersion of the air-fuel ratio is reflected by the gradient of the detection value of the crank angle sensor 25. In the detection process, therefore, the detection value of the crank angle sensor 25 is monitored within a predetermined period, and the magnitude of the gradient of the detection value is detected as a degree of dispersion. Furthermore, the ECU 50 executes the determination process for determining, based on the calculated degree of dispersion, whether the fuel injection valve(s) 12 corresponding to one or some of the cylinders is/are normal or abnormal.

It should be noted herein that the aforementioned temperature raising process is intended to set the dispersion of the air-fuel ratio among the cylinders. Therefore, when the temperature raising process and the detection process interfere with each other, it may be determined that there may be an abnormality in one or some of the fuel injection valves 12, on the assumption that the degree of dispersion of the air-fuel ratio is large, despite the fact that all the fuel injection valves 12 are normal. Therefore, the ECU 50 according to the present embodiment of the disclosure performs interference avoidance control for avoiding interference of the detection process and the temperature raising process with each other, as will be described hereinafter.

Figure 2:
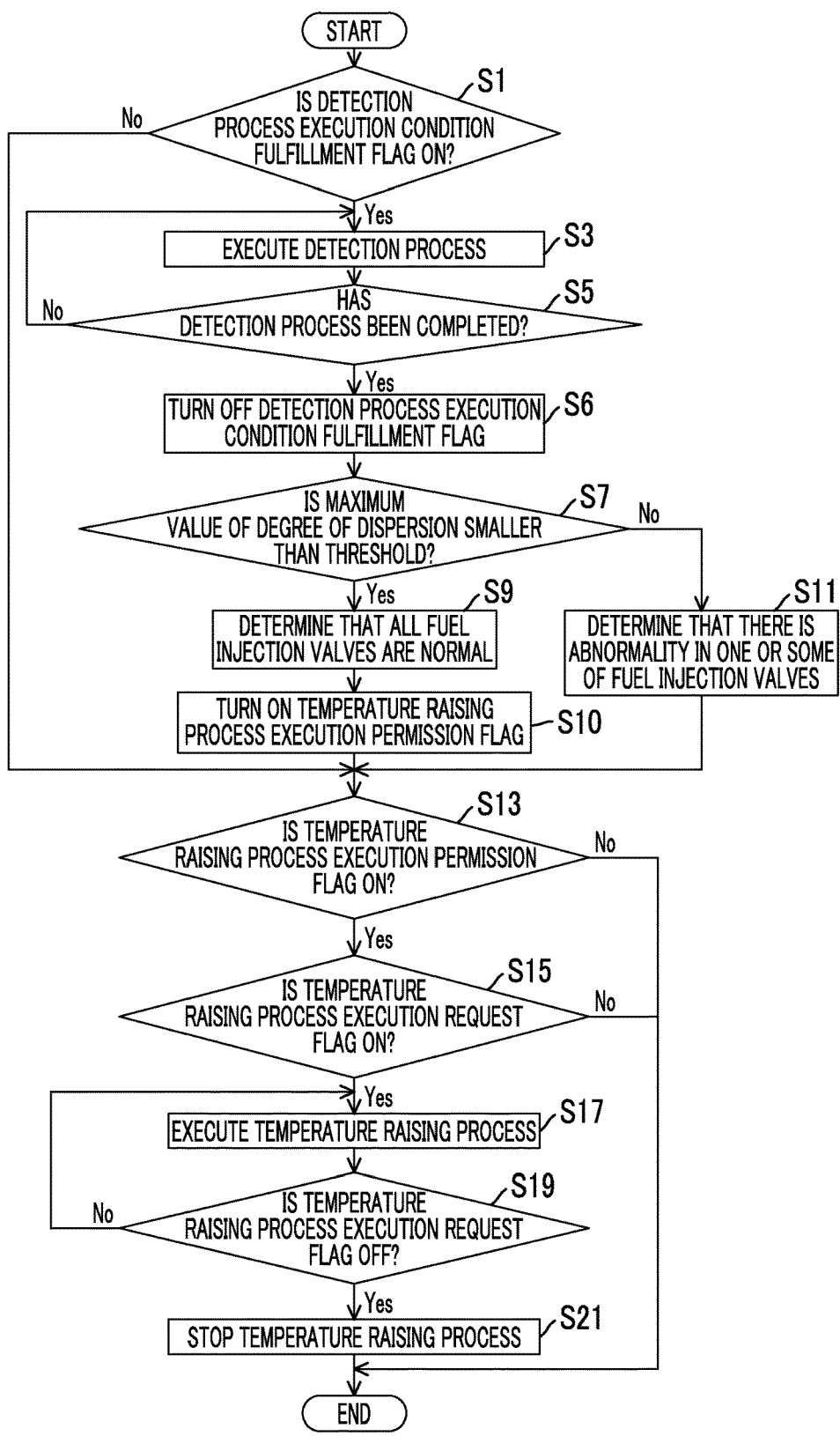
FIG. 2 is an exemplary flowchart showing an example of interference avoidance control that is performed by an electronic control unit (hereinafter referred to as an ECU) with which the control apparatus according to the embodiment of the disclosure is equipped.

FIG. 2 is a flowchart showing an example of interference avoidance control that is performed by the ECU 50. The flowchart of FIG. 2 is repeatedly executed at intervals of a predetermined period. First of all, it is determined whether or not an execution condition fulfillment flag for the detection process is ON (step S1). The execution condition fulfillment flag for the detection process is switched from OFF to ON, for example, when a condition that the detection process has not been executed during the same trip, a condition that the engine 20 has been warmed up, a condition that the operating state of the engine 20 is not a transient operating state such as sudden acceleration, sudden deceleration or the like, a condition that each of the rotational speed of the engine 20 and the throttle opening degree is confined within a predetermined range, a condition that air-fuel ratio feedback control is being performed based on a detection value of the air-fuel ratio sensor 33, and a condition that the suspension of fuel supply is not being carried out are all fulfilled. Incidentally, it is determined whether or not the aforementioned respective conditions are fulfilled, based on the OFF state of a detection process completion flag indicating the completion of the detection process during the same trip and detection values of various sensors such as the coolant temperature sensor 29, the crank angle sensor 25, the throttle opening degree sensor 14, the accelerator depression amount sensor 11 and the like. If the result of the determination in step S1 is negative, processes starting from step S13 are executed.

If the result of the determination in step S1 is positive, namely, if the aforementioned respective conditions are all fulfilled, the detection process in which the detection value of the crank angle sensor 25 is monitored over a predetermined period is executed (step S3). The process of step S3 is an exemplary process that is executed by the detection process unit, and is an example of the detection process for detecting the degree of dispersion of the air-fuel ratio among the plurality of the cylinders.

Subsequently, it is determined whether or not the detection process has been completed (step S5). In concrete terms, it is determined whether or not the execution period of the detection process has exceeded the above-mentioned predetermined period. If the result of the determination in step S5 is negative, the detection process is continued. If the result of the determination in step S5 is positive, the execution condition fulfillment flag for the detection process is switched from ON to OFF (step S6), and it is determined whether or not a maximum value of the degree of dispersion acquired during the execution of the detection process is smaller than a threshold (step S7).

If the result of the determination in step S7 is positive, a normal determination is made, namely, it is determined that all the fuel injection valves 12 are normal, on the assumption that the degree of dispersion is small (step S9), and an execution permission flag for the temperature raising process is switched from OFF to ON (step S10). If the result of the determination in step S7 is negative, an abnormal determination is made, namely, it is determined that there is an abnormality in one or some of the fuel injection valves 12, on the assumption that the degree of dispersion is large (step S11). In the process of step S11, the process of step S10 is not executed, and the execution permission flag for the temperature raising process is held OFF. Each of the processes of steps S7, S9 and S11 is an exemplary process that is executed by the determination process unit, and is an example of the determination process for determining, based on the detected degree of dispersion, whether or not the plurality of the fuel injection valves 12 corresponding to the plurality of the cylinders respectively are normal.

Subsequently, it is determined whether or not the execution permission flag for the temperature raising process is ON (step S13). If the result of the determination in step S13 is positive, it is determined whether or not an execution request flag for the temperature raising process is ON (step S15). The execution request flag for the temperature raising process is switched from OFF to ON, for example, when a cumulative operating period of the engine 20 has exceeded a predetermined period and the necessity to regenerate the three-way catalyst 31 by raising the temperature thereof has arisen, etc. If the result of the determination in step S15 is positive, the temperature raising process is executed (step S17). If the result of the determination in step S13 or step S15 is negative, the present control is ended without executing the temperature raising process. The process of step S17 is an exemplary process that is executed by the temperature raising process unit, and is an example of the temperature raising process for making the target air-fuel ratio in at least one of the plurality of the cylinders belonging to the engine 20 equal to the rich air-fuel ratio that is smaller than the theoretical air-fuel ratio, making the target air-fuel ratio in each of the other remaining ones of the plurality of the cylinders equal to the lean air-fuel ratio that is larger than the theoretical air-fuel ratio, and raising the temperature of the three-way catalyst 31 that purifies the exhaust gas from the plurality of the cylinders.

When the temperature raising process is executed, it is determined whether or not the execution request flag for the temperature raising process is OFF (step S19). The execution request flag for the temperature raising process is switched from ON to OFF, for example, when the temperature raising process is continued for a predetermined period. If the result of the determination in step S19 is negative, the temperature raising process is continued. If the result of the determination in step S19 is positive, the temperature raising process is stopped (step S21), and the present control is ended.

If the result of the determination in step S13 is negative, the execution permission flag for the temperature raising process has not been turned ON in step S10. In concrete terms, this is the case where the result of the determination in step S1 is negative and the detection process has not been executed during the same trip, or the case where the detection process has been completed but the abnormal determination has been made in step S11. In this case, the present control is ended without determining whether or not the execution request flag for the temperature raising process is ON. That is, in this case, the temperature raising process is not executed. Incidentally, the temperature raising process is not executed either when there is no execution request for the temperature raising process even after the process of step S10 is executed.

Figure 3:
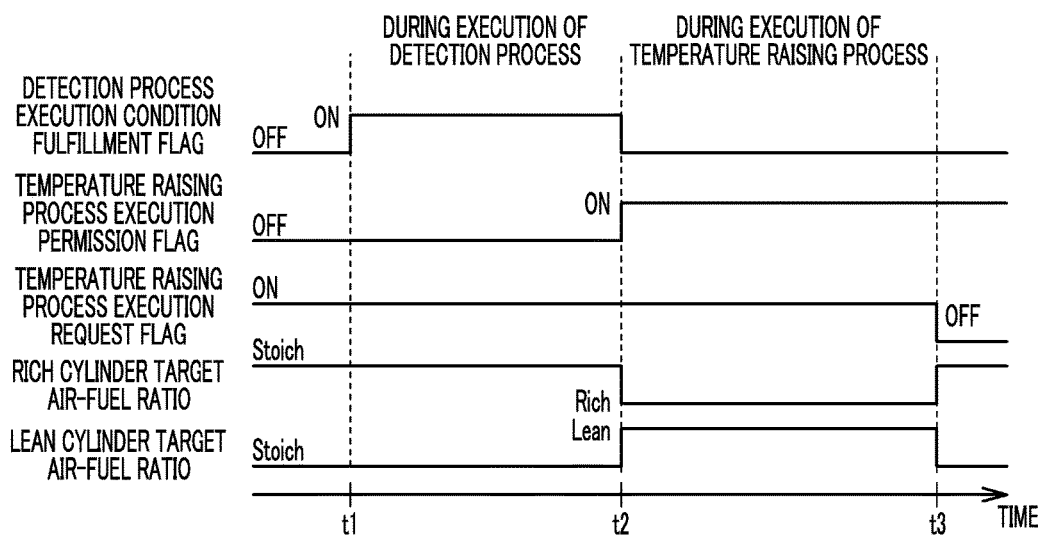
FIG. 3 is an exemplary timing chart regarding interference avoidance control in the control apparatus.

FIG. 3 is an exemplary timing chart regarding interference avoidance control. The present timing chart exemplifies a case where the execution request flag for the temperature raising process has been ON since a timing prior to the execution of the detection process and the above-mentioned normal determination is made. At a time point t1, the execution condition fulfillment flag for the detection process is switched from OFF to ON, and the detection process is executed. After that, at a time point t2, the detection process is completed, the execution condition fulfillment flag for the detection process is switched from ON to OFF, the above-mentioned normal determination is made, and the execution permission flag for the temperature raising process is switched from OFF to ON. Thus, the target air-fuel ratio in one of the plurality of the cylinders is changed over from the theoretical air-fuel ratio to the rich air-fuel ratio, the target air-fuel ratio in each of the other remaining cylinders is changed over from the theoretical air-fuel ratio to the lean air-fuel ratio, and the temperature raising process is executed. After that, when the execution request flag for the temperature raising process is switched from ON to OFF at a time point t3, the air-fuel ratio of each of the plurality of the cylinders is set to the theoretical air-fuel ratio, and the temperature raising process is ended.

As described above, the execution permission condition for the temperature raising process is that the normal determination is made, namely, it is determined that all the fuel injection valves 12 are normal after the completion of the detection process during the same trip. In other words, the detection process is executed avoiding a period in which the temperature raising process is being executed. Accordingly, the interference of the detection process and the temperature raising process with each other is avoided, and the deterioration in the accuracy in determining, based on the degree of dispersion of the air-fuel ratio, whether the fuel injection valves 12 are normal or abnormal is suppressed. Besides, the detection process is not obstructed either by the temperature raising process, so the number of opportunities to execute the detection process is also restrained from decreasing.

Furthermore, in the present embodiment of the disclosure, when it is determined that the plurality of the fuel injection valves are normal, the execution of the temperature raising process is permitted. For example, on the assumption that the execution of the temperature raising process is uniformly permitted after the completion of the detection process, the temperature raising process may be executed even when the abnormal determination is made. Even when the temperature raising process is executed in this case, it may be impossible to appropriately raise the temperature of the three-way catalyst 31. Besides, for example, when there is an abnormality such as clogging or the like in the fuel injection valve 12 corresponding to the cylinder whose target air-fuel ratio is set to the lean air-fuel ratio in the temperature raising process, the actual air-fuel ratio in this cylinder in the temperature raising process is leaner than the set lean air-fuel ratio, so misfire may be caused. In the present embodiment of the disclosure, the temperature raising process is executed when the normal determination is made, namely, it is determined that all the fuel injection valves 12 are normal, with higher priority given to the execution of the detection process than to the execution of the temperature raising process. Therefore, the temperature raising process is executed when the normal determination in which the effect of the temperature raising process is expected is made. Besides, the occurrence of misfire during the execution of the temperature raising process is also suppressed.

Figure 4A:
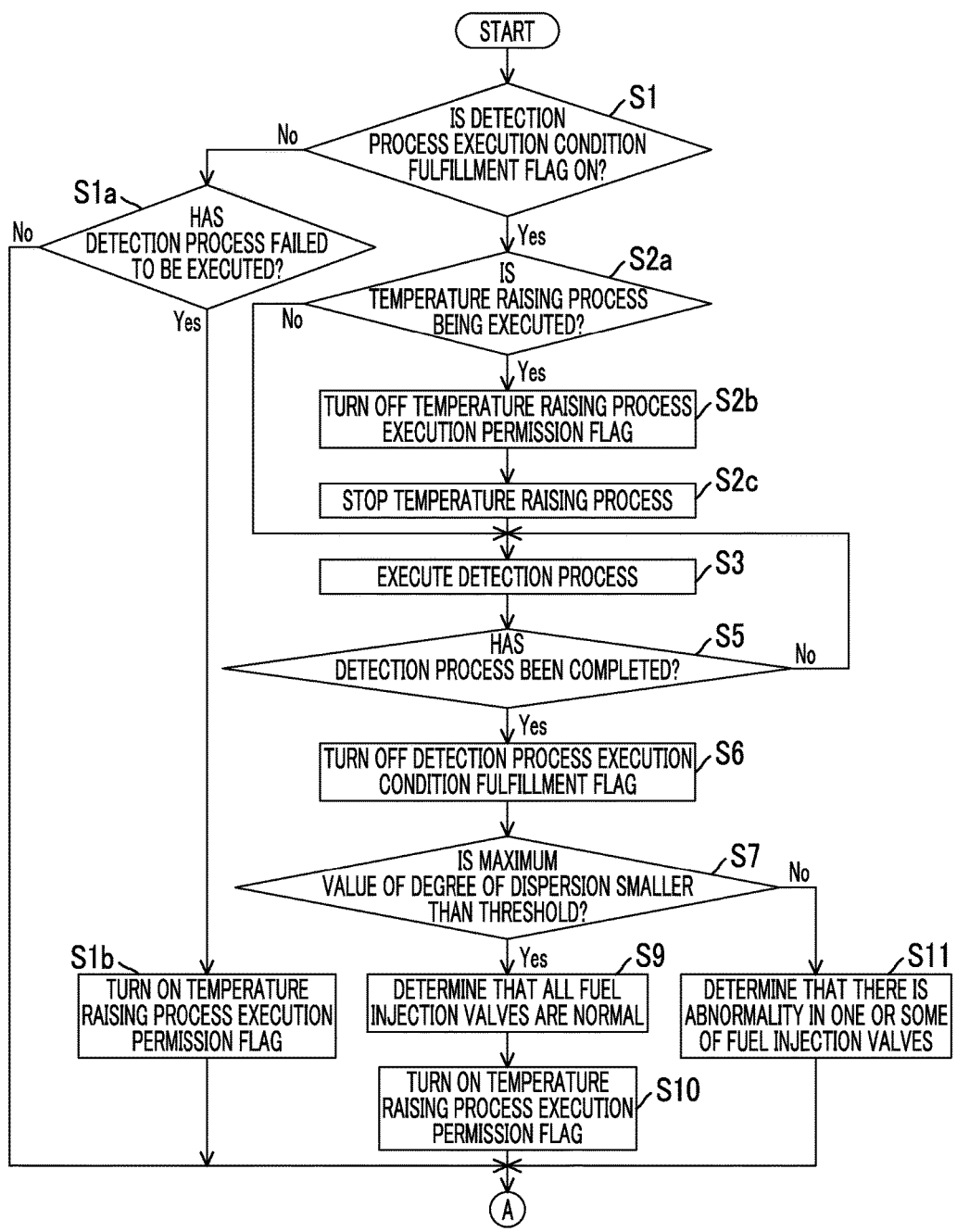
FIG. 4A is the first half of a flowchart showing a modification example of interference avoidance control that is performed by the ECU.
Figure 4B:
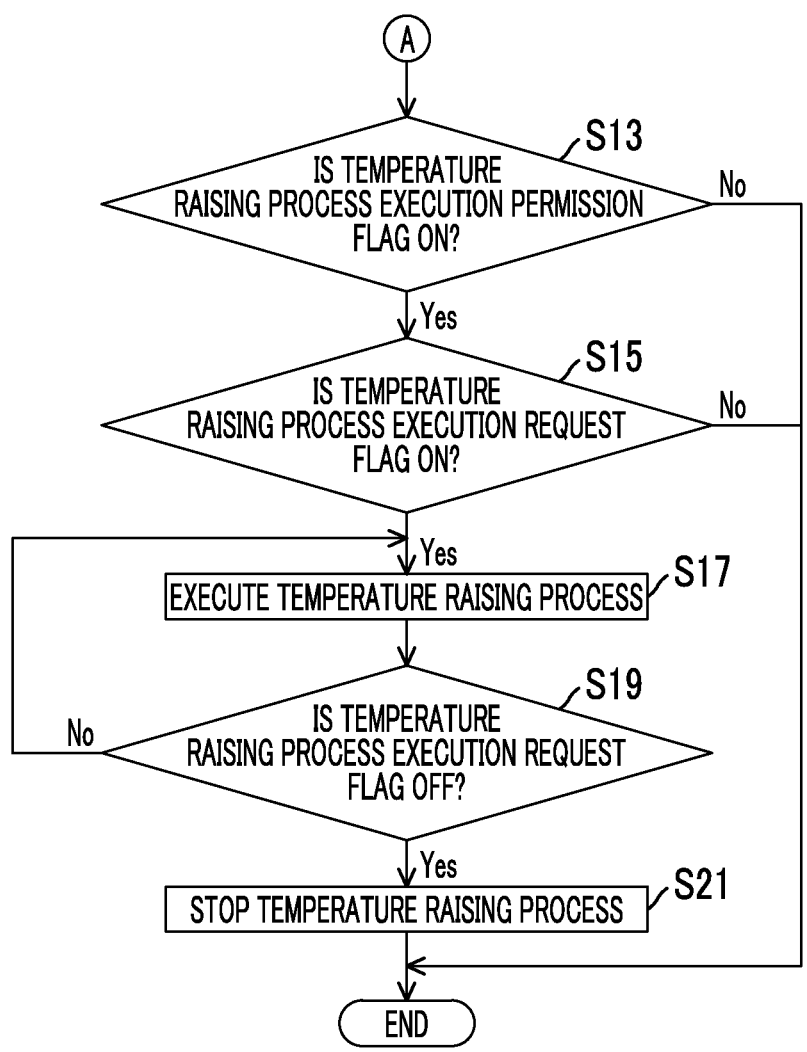
FIG. 4B is the latter half of the flowchart showing the modification example of interference avoidance control that is performed by the ECU.

Next, a modification example of interference avoidance control that is performed by the ECU 50 will be described. FIG. 4A and FIG. 4B are flowcharts showing the modification example of interference avoidance control that is performed by the ECU 50. In the modification example of interference avoidance control, unlike the above-mentioned case, the temperature raising process is temporarily stopped and the detection process is executed when the execution condition for the detection process is fulfilled during the execution of the temperature raising process. Incidentally, in the modification example of interference avoidance control, the same processes as in the control according to the aforementioned embodiment of the disclosure are denoted by the same reference symbols respectively, and redundant description thereof will be omitted.

If the result of the determination in step S1 is positive, it is determined whether or not the temperature raising process is being executed (step S2a). If the result of the determination in step S2a is negative, the processes starting from step S3 are executed. If the result of the determination in step S2a is positive, the execution permission flag for the temperature raising process is switched from ON to OFF (step S2b), and the temperature raising process is stopped (step S2c). That is, the target air-fuel ratio in each of the cylinders is set to the same theoretical air-fuel ratio, and the processes starting from step S3 are executed afterward. In this manner, the detection process is executed while avoiding the period in which the temperature raising process is being executed, by stopping the temperature raising process when there is a request to execute the detection process.

After that, the execution permission flag for the temperature raising process is switched from OFF to ON through the processes of steps S5 to S9 (step S10). If the results of the determinations in step S13 and step S15 are positive, the stopped temperature raising process is resumed (steps S17, S19, and S21). When step S11 is executed, the execution permission flag for the temperature raising process remains OFF. Therefore, the result of the determination in step S13 is negative, and the present control is ended without resuming the temperature raising process.

Incidentally, if the result of the determination in step S1 is negative, it is determined whether or not the detection process has failed to be executed (step S1a). If the result of the determination in step S1a is positive, the execution permission flag for the temperature raising process is switched from OFF to ON (step S1b), and the processes starting from step S13 are executed. If the result of the determination in step S1a is negative, the processes starting from step S13 are executed. Accordingly, for example, when the detection process has not been executed, or when the detection process has been executed but the result of the determination in step S9 is normal, the temperature raising process can be executed in the processes starting from step S13. On the other hand, when the detection process has been executed but the abnormal determination is made in step S11, the execution permission flag for the temperature raising process remains OFF, so the temperature raising process is not executed.

Figure 5:
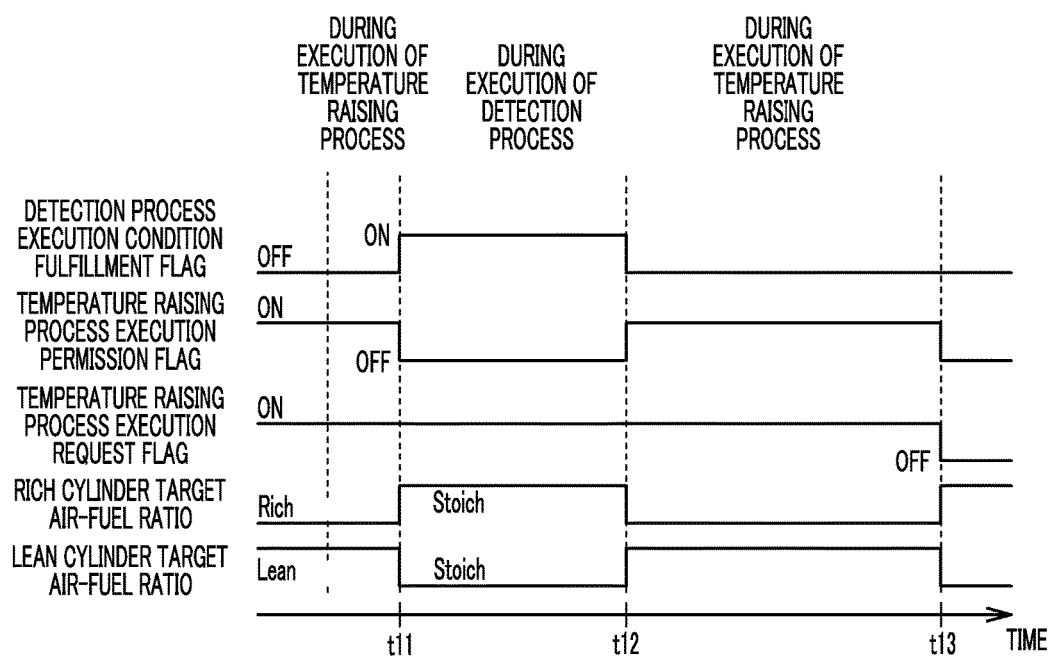
FIG. 5 is an exemplary timing chart regarding the modification example of the interference avoidance control.

FIG. 5 is an exemplary timing chart regarding the modification example of interference avoidance control. The present timing chart indicates a case where the temperature raising process is temporarily stopped, the detection process is executed, and the temperature raising process is resumed afterward. When the execution condition fulfillment flag for the detection process is switched from OFF to ON at a time point t11 during the execution of the temperature raising process, the execution permission flag for the temperature raising process is switched from ON to OFF, and the detection process is executed.

After that, the detection process is completed at a time point t12, the execution condition fulfillment flag for the detection process is switched from ON to OFF, and the above-mentioned normal determination is made. Thus, the execution permission flag for the temperature raising process is switched from OFF to ON again, and the temperature raising process is executed again. When the execution request flag for the temperature raising process is switched from ON to OFF at a time point t13, the temperature raising process is stopped.

As described above, when there is a request to execute the detection process during the execution of the temperature raising process, the temperature raising process is stopped, and the detection process is executed. Accordingly, the interference of the detection process and the temperature raising process with each other is avoided, and the deterioration in the accuracy in determining, based on the degree of dispersion of the air-fuel ratio, whether the fuel injection valves 12 are normal or abnormal is suppressed. Besides, the temperature raising process can be executed even when the detection process has not been completed. Therefore, the frequency with which the temperature raising process is executed can be ensured, and the temperature of the three-way catalyst 31 can be raised.

Although the embodiment of the disclosure has been described above in detail, the disclosure is not limited to this specific embodiment thereof, but can be subjected to various modifications and alterations within the scope of the gist of the disclosure set forth in the claims.

In the aforementioned embodiment of the disclosure, the detection process for detecting the degree of dispersion of the air-fuel ratio based on the gradient of the detection value of the crank angle sensor 25 is executed. However, the detection process may be executed based on the detection value of the air-fuel ratio sensor 33. This is because of the following reason. When the air-fuel ratio disperses among the plurality of the cylinders, the air-fuel ratio of the exhaust gas discharged from each of the cylinders also disperses. Therefore, the gradient of the detection value of the air-fuel ratio sensor 33 increases, and the dispersion of the air-fuel ratio among the plurality of the cylinders is reflected.

In each of the aforementioned embodiment of the disclosure and the modification example thereof, when a changeover from the detection process to the temperature raising process is made, a gradual change process may be executed such that the air-fuel ratio of each of the cylinders gradually reaches the target air-fuel ratio of each of the cylinders in the temperature raising process. Besides, in the aforementioned modification example, even when a changeover from the temperature raising process to the detection process is further made, the gradual change process may be executed such that the air-fuel ratio of each of the cylinders set in the temperature raising process gradually reaches the theoretical air-fuel ratio. Thus, the air-fuel ratio can be restrained from changing in a short time, and the occurrence of a torque shock can be suppressed. Besides, in the aforementioned modification example, when a changeover from the temperature raising process to the detection process is made, the detection process is desired to be started after the gradual change process is ended and the target air-fuel ratio of each of the cylinders reaches the theoretical air-fuel ratio. This is because the deterioration in the accuracy of determination can be suppressed by avoiding the start of the detection process during the gradual change process.

In each of the aforementioned embodiment of the disclosure and the modification example thereof, the temperature raising process is executed by setting the target air-fuel ratio of each of the cylinders to the rich air-fuel ratio or the lean air-fuel ratio, but the method of realizing the rich air-fuel ratio and the lean air-fuel ratio is not limited thereto. For example, the rich air-fuel ratio in the temperature raising process may be realized by correcting the fuel injection amount corresponding to the target air-fuel ratio in the case of the normal operating state where the temperature raising process is not executed, in an increasing manner at a predetermined ratio, and the lean air-fuel ratio in the temperature raising process may be realized by correcting this fuel injection amount in a decreasing manner at a predetermined ratio.

What is claimed is:

1. A control apparatus for an internal combustion engine including a plurality of cylinders, comprising:
   an electronic control unit including a processor and a memory, the memory storing a program that when executed by the processor causes the electronic control unit to:
   execute a temperature raising process for raising a temperature of a catalyst that purifies exhaust gas from the plurality of the cylinders, the temperature raising process comprising controlling, by the electronic control unit, an air-fuel ratio in at least one of the plurality of cylinders to deliberately be equal to a rich air-fuel ratio that is smaller than a theoretical air-fuel ratio while controlling, by the electronic control unit, an air-fuel ratio in each of the other remaining ones of the plurality of the cylinders to deliberately be equal to a lean air-fuel ratio that is larger than the theoretical air-fuel ratio;

execute a detection process for detecting a degree of dispersion of the air-fuel ratio among the plurality of the cylinders;

execute a determination process for determining whether or not a plurality of fuel injection valves corresponding to the plurality of the cylinders respectively are normal, based on the detected degree of dispersion; and execute the detection process while avoiding a period in which the temperature raising process is being executed, wherein the electronic control unit is configured to stop the temperature raising process and execute the detection process when there is a request to execute the detection process during execution of the temperature raising process.

2. The control apparatus according to claim 1, wherein the electronic control unit is configured to permit execution of the temperature raising process when it is determined that the plurality of the fuel injection valves are normal after completion of the detection process.

3. A control method of a control apparatus for an internal combustion engine, the internal combustion engine including a plurality of cylinders, the control method comprising:

raising a temperature of a catalyst that purifies exhaust gas from the plurality of the cylinders, wherein raising the temperature of the catalyst comprises controlling, by an electronic control unit, an air-fuel ratio in at least one of the plurality of cylinders to deliberately be equal to a rich air-fuel ratio that is smaller than a theoretical air-fuel ratio, while controlling, by the electronic control unit, an air-fuel ratio in each of the other remaining ones of the plurality of the cylinders to deliberately be equal to a lean air-fuel ratio that is larger than the theoretical air-fuel ratio;

detecting a degree of dispersion of the air-fuel ratio among the plurality of the cylinders;

determining whether or not a plurality of fuel injection valves corresponding to the plurality of the cylinders respectively are normal, based on the detected degree of dispersion;

detecting the degree of dispersion while avoiding a period in which the temperature of the catalyst is being raised; requesting to execute the detection process during execution of the temperature raising process; and, in response to the request to execute the detection process during execution of the temperature raising process, stopping the temperature raising process and executing the detection process.

* * * * *